Sept. 10, 1957 W. F. GRUPE ET AL 2,806,077
CORE WOUND BATTERY
Filed Aug. 11, 1955 2 Sheets-Sheet 1
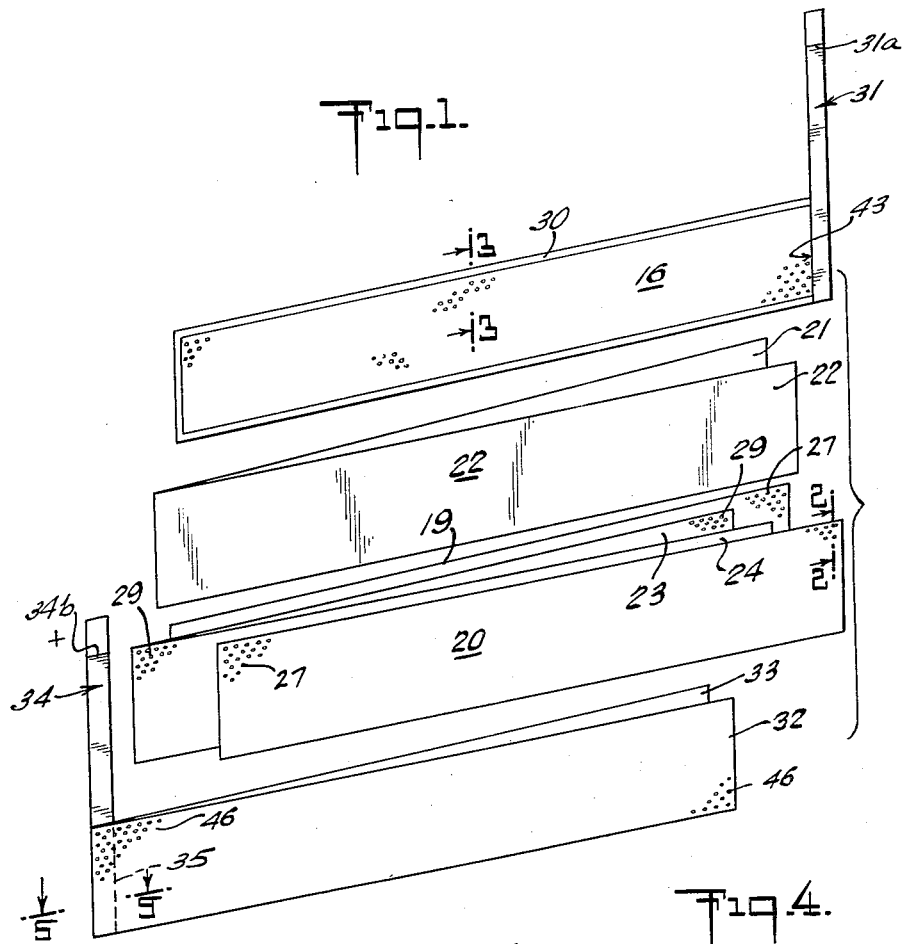
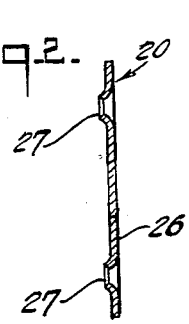
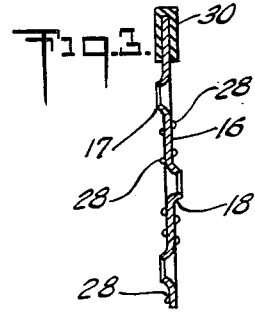
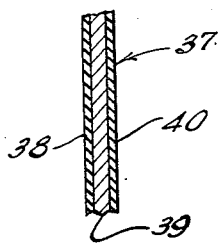
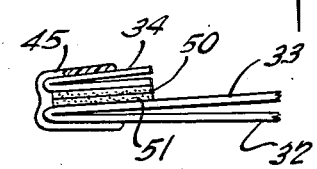
INVENTOR
WILLIAM F. GRUPE
AND WALTER E. HANLEY
BY
ATTORNEY

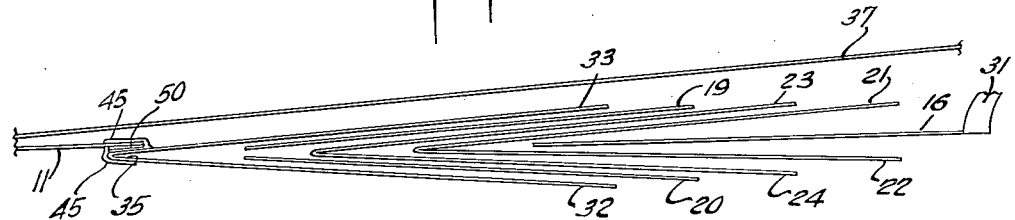
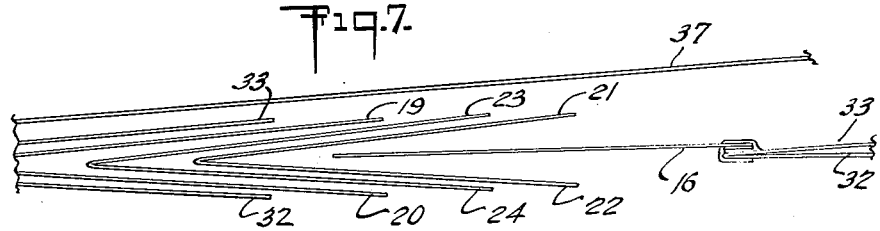
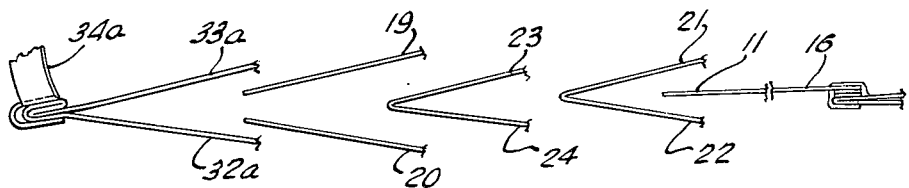
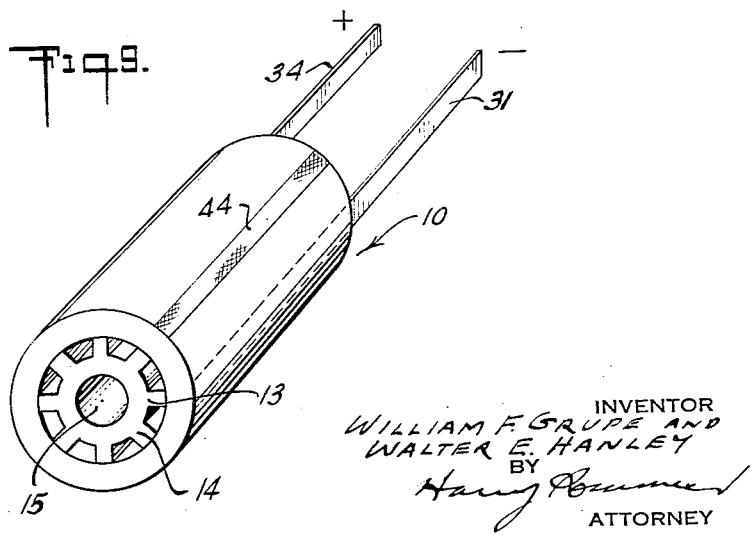

United States Patent Office 2,806,077
Patented Sept. 10, 1957

2,806,077

CORE WOUND BATTERY

William F. Grupe, River Edge, and Walter E. Hanley, Lyndhurst, N. J., assignors to Peerless Roll Leaf Co., Union City, N. J., a corporation of New Jersey Application August 11, 1955, Serial No. 527,680

15 Claims. (Cl. 136—90)

This invention relates to the art of batteries, and more particularly to core wound batteries discharged on immersion in salt or fresh water, or other electrolytic medium. While the invention is highly advantageous when embodied in a primary battery having a high discharge rate on immersion in an electrolyte, it is not limited to primary batteries, and secondary batteries made in accordance with the disclosure herein shall be deemed to come within the purview and scope of the invention and to be covered by this application.

Efforts have heretofore been made to construct such battery, using silver chloride electrolytically formed on silver foil as one element, a paper strip being wound between the two elements, the electrolyte being brought into the cell by capillary action through the paper. Such batteries have generally proved to be ineffective, for the following and other reasons: The amount of electrolyte that can be brought into the cell was restricted to capillary action, thus restricting the action of the cell or its discharge rate and restricting the use of such batteries to low discharge rate applications. The connections of all the elements extended out of the body of the windings for connection externally. Being all submerged in the electrolyte it proved difficult to provide effective insulation, exposing the cells to danger of damage on immersion and to further danger of damage in handling or mounting. Short circuiting with generation of considerable heat and reduction of plate area occurred on immersion of such batteries in the electrolyte; the active silver chloride was reduced to metallic silver, and the magnesium converted to magnesium chloride. As the discharge rate increased, more magnesium chloride was formed in a given time, resulting in a supersaturated solution and increasing the conductivity between the positive and negative plates, resulting in partial short circuiting and increasing the heat generated on discharge, thus converting the magnesium and magnesium chloride into magnesium oxide and oxychloride. These salts being insoluble, the internal resistance of the batteries increased, and the effective plate area was cut down.

The primary battery embodying this invention has exceptionally long shelf life, with instant ability to discharge at high rate, as set forth below, in the table of discharge time. The short come up time of the battery is an important feature thereof, and is due to the novel features of said battery, providing for instant wetting of the entire surfaces; this was not possible in previous capillary units.

The foregoing and other disadvantages of such batteries of the prior art are overcome by the practical and efficient battery of the present invention, utilizing fused silver chloride together with other elements of novel form and arrangement, as herein set forth, providing a battery having a high discharge rate, in a structure that will permit accurate, predictable, and uniform performance and control of the discharge rate through a great range of power produced, with a minimum of plate area. The accompanying drawings, wherein like reference characters indicate like parts, illustrate representative practical embodiments of the invention, wherein:

Fig. 1 is an exploded perspective view of a single cell for a wound battery embodying the invention, showing the parts thereof prior to assembly and winding on a core, such as is shown in Fig. 9, Fig. 2 is an enlarged, vertical sectional view of a silver chloride plate 20, taken at line 2—2 of Fig. 1, Fig. 3 is a fragmentary, enlarged, vertical sectional view of a portion of the magnesium plate 16 at the margin thereof, taken on line 3—3 of Fig. 1, Fig. 4 is an enlarged, vertical sectional view of the insulating plate 37, taken on line 4—4 of Fig. 6, Fig. 5 is an enlarged, fragmentary plan view of one end of a battery embodying the invention, taken on line 5—5 of Fig. 1, Fig. 6 is a fragmentary plan view of one end of a battery embodying the invention, having more than one cell, Fig. 7 is a similar view of a portion of such multicell battery intermediate the terminals thereof, Fig. 8 is a similar view of the second terminal of said battery, also schematically showing a portion of the adjacent cell, and Fig. 9 is a perspective view of a battery embodying the invention in completed form, wound around a core.

A core wound battery 10 of the present invention is shown in Fig. 9, with the terminals 31, 34 thereof extending beyond the core and all cells being wound internally. The first cell has its terminal 34 secured to the core 13, with the terminal end disposed in the same plane and extended beyond the core. The core 13 may be longitudinally slotted as at 14, Fig. 9, and may be medially axially apertured as at 15, to promote complete flow of the liquid electrolyte therethrough and around the battery on immersion.

Pursuant to the invention, a magnesium strip or plate 16 is provided as the negative element of the battery; in the form shown in Fig. 1, plate 16 is preferably mounted in the center of the cell and is pierced with a pointed needle or instrument so as to define burrs 17, 18 (Fig. 3) on opposite faces thereof. Both faces of the magnesium strip may be thus utilized in the battery of the present invention, as will appear from the description below. The burrs enable the gas generated on discharge of the battery to be freely released. The burrs may be levelled down to control their height by passing said strip between adjustable rollers, for example, or by other suitable means, to provide burrs of predetermined height. By varying the height of the burrs, a channel or capillary flow of the electrolye may be attained to control the amount of electrolyte flowing through the battery on immersion, to thereby control the discharge rate of the battery. If the burrs are held to the height of from two to three thousandths of an inch thereon winding the battery and immersion in the electrolyte, a capillary action is attained; where the burrs are above that height it is found that they define channels through which the electrolyte may flow. The invention is not limited to the use of burrs or burrs of any special height; the disclosure thereof is to fully explain practical additional features of the invention. The use of burrs provides a further control of the rate of discharge of the battery; it is a valuable means for predetermining the discharge characteristics of the battery.

In assembly of the battery, the magnesium strip 16 is preferably positioned intermediate a pair of fused silver chloride strips 19, 20; one or more separator strips (21, 22, 23, 24) are positioned between the magnesium strip 16 and the silver chloride strips 19, 20 (as in Fig. 6). Strips 19 and 20 are preferably made of fused silver chloride, which offers the greatest weight of chloride against a light layer electrolytically developed on silver which has been rolled to a predetermined thickness; the outer faces (25, 26, Fig. 2) of the silver chloride strips (19, 20) are preferably partially reduced to metallic silver films to improve conductivity and to promote the starting action.

Each silver chloride strip (19, 20) is preferably pierced so as to define a plurality of burrs 27 (Fig. 2) on the face thereof which, in the assembly of the battery, is disposed toward the magnesium strip 16. These burrs may be leveled down to a predetermined height to provide a capillary or channeling action, by passing the silver chloride strips between adjustable rollers or by other levelling means. The provision of the burrs 27 on the silver chloride strips, and burrs 17, 18 on the magnesium strip 16 enables accurate control of distances, and thus control of voltage.

The magnesium strip 16, may be wire brushed on one or both faces thereof to remove and reduce the passiveness of the magnesium by removing the oxide, thus accelerating the initial pick-up time and voltage. Strip 16 may have means thereon to make more uniform or to delay the discharge rate of the battery on immersion in the electrolyte. Said means may comprise applying to one or both faces of the strip 16 a partial or intermittent insulating or inhibiting layer or film such as globules of gum arabic 28 (Fig. 3) to slow down the electrolytic action and therefore the disintegration or breaking up of the strip 16, further contributing to the uniform, predictable, discharge rate of the battery. The coating particles such as indicated at 28 may be applied, if desired, to totally cover a portion—for example, up to half, of the surface. Such coating may be of such characteristics (or may be treated for the purpose) so as to be slowly dissolved as the battery is discharged, thus continuously exposing new, active material, to prolong the effective life of the unit.

Magnesium strip 16 is preferably provided with a marginal insulation layer 30 (Fig. 3) applied thereto in any desired or convenient manner to provide a continuous marginal electrical conductor to the terminal 31 notwithstanding separation of portions of the body of plate 16 on discharge of the battery, and to avoid short circuiting across the plate ends.

The separator strips 21—24, may be of any suitable type which will transmit water and ions. The arrangement shown in Fig. 1 is convenient for permitting the free flow of ions while safeguarding the battery by preventing any metallic or solid salt particles from bridging across and causing short circuiting between the negative and positive plates. By use of various perforations and separator materials in the separator strips 21—24 voltage and discharge rate may be further controlled.

In the arrangement shown in Fig. 1 (which is only one of many forms suitable for use in carrying out the invention) thin tissue sheets 21, 22 are shown for use as separators and filters. The strips 23, 24 may be cellophane (not moistureproof) strips, perforated as indicated at 29 in Fig. 1. If cellophane or other equivalent water permeable strips 23, 24 are used, tissue sheets 21, 21 may be dispensed with. Any other suitable separator of paper or other material which will allow ion flow may be used in place of or in addition to separator sheets 21—24. While other materials may be used, if desired, the making of strips 23, 24 of cellophane, is desirable due to its high wet strength, resistance to perforation by burrs, and its ability to transmit water and ions.

The terminal 34 is connected to the silver chloride strips 19, 20 by any suitable means, such as by lengths of silver strips 32, 33, which may be silver foil of about .0015 to .0017 inch in thickness pierced to leave the pierced material projecting to a definite height at one side, then repierced on the opposite side, leaving the pierced material to a definite height on the order of the burrs 28 on magnesium strip 16 (Fig. 3). These raised sections or burrs act as electrolyte and gas channels or as a capillary in the wound immersed battery, depending on their height. The silver strips 32, 33, superposed directly on the silver chloride strips 19, 20, make direct contact therewith on winding of the battery to its completed form shown in Fig. 9.

The battery of this invention may consist of a single cell, such as shown in Fig. 1, or of a plurality of cells which may be connected in a parallel, or in a series arrangement, as for example, shown in Figs. 6, 7, and 8, from which it will be noted that the end 11 of the magnesium strip 16 remote from the terminal 31 has soldered or otherwise secured thereto, the silver strips 32, 33 which may conveniently consist of a single length of silver strip folded to define an elongated V as shown in Fig. 1, preferably of the same length as the fused silver chloride plates 19, 20. The surfaces to be connected, such as the surface of terminal 34 and the surface of the fold 35 of silver strips 32—33, the surface of magnesium plate 16 at the end 43 thereof and the surface of the end 11 of the magnesium plate 16 of one cell of a multicell battery embodying our invention, and the fold 35 of the silver strips 32—33 of the adjacent cell (Figs. 6–8) may be soldered or otherwise secured together. For example, such surfaces, as shown at 50, 51, Figs. 5 and 6, may be tinned and then sweated together, to form a substantially homogeneous electrical contact. Then the connected surfaces may be covered with a layer or coating of insulation, such as shown at 45 in Figs. 5 and 6. This method allows for intercell connection without external cell leads, and may be repeated between cells in the manner illustrated in Figs. 5 and 7, for making a battery up of any desired numbers of cells. The silver strips 32, 33 may be provided with a terminal 34 secured thereto at their fold 35, as in Fig. 1, whereupon the silver strips would form the outermost surfaces of the single cell unit shown of Fig. 1. Where a number of cells are to be connected, the silver strips 32, 33, instead of having the terminal 34 secured thereto at their fold 35, may be connected to the magnesium strip 16 of the next cell unit; said next cell may be assembled around the magnesium strip 16, in the manner illustrated in Fig. 7. This arrangement, exemplified in Figs. 6–8 may be repeated for any desired number of connected cells, providing inter-cell connection without external leads.

In the positive terminal end cell (Fig. 8) the outermost silver strips 32a, 33a, have the terminal 34a (corresponding to terminal 34 of Fig. 1) secured thereto.

An insulating film 37 is preferably positioned along the side of the battery so that the cells may be around the same and thus insulated. The insulating film 37 may be made of any suitable vinyl or other insulating material and its total thickness may be approximately .007 inch. It may, as illustrated in Fig. 4, consist of a film of moisture proof cellophane 38 to one side of which a rubber compound coating 39 is applied; an additional sheet of moistureproof cellophane 40 may be laminated to the other face of the rubber sheet 39. The insulation strip 37, being wound the entire length of the battery, insures uniform action in every cell, prevents jumping across any cell, and shields each cell from the others in the common electrolyte. All intercell connections may be protected by the layer or strip of insulation 45 (Figs. 5 and 6) at the point of intercell connections in order that no plate reaction may there take place; the terminals 31, 34 may be coated with insulation for a major portion of their length (for example, to the lines 31a, 34b, Fig. 1). For the positive terminal 34, a silver strip or any other suitable conductor is preferably soldered or otherwise connected to fold 42 of silver strips 32—33. For the negative terminal or lead 31, a strip of silver or any other suitable conductor, is soldered to end 43 of magnesium plate 16.

In assembly, the separator or separators 21, 22, are placed lengthwise along the magnesium strip 16 and a chloride plate (19, 20) is placed on each side of the magnesium strip, with the raised, pierced faces of said chloride strips toward the magnesium plate. The chloride plates 19, 20 are held in place by suitable means, such as by using an insulation with an adhesive at the end of the magnesium plate. In winding the battery, the insulating strip 37 is wound in full width over the combined set-up and into the convolutions of the battery. Connection of the negative end of a multi-cell battery with the next cell is made, as shown in Fig. 6, as follows:

The magnesium plate of the next cell 16, which has the fold 35 of the silver strip soldered to it and the chloride strips, which are positioned over the separators, are placed between the folded silver strips 32, 33, allowing the silver to come into contact with and be pressed tightly against the fused silver chloride strips 19, 20. Electrical contact may be further made directly between the silver and chloride strips by welding the same in spots under pressure and at a temperature of about 400° F.

At the end of the first cell (Fig. 8) the silver strips 32, 33 are soldered to the magnesium strips 16a of the next cell and act as a connector, allowing repetition of the assembly operation for any number of cells to be wound together, all having internal connections; the last cell (Figs. 6 and 9) has a magnesium strip 16 with the lead 31 attached thereto. The chloride strips 19, 20 and separators are placed on the magnesium strip 16 of the last cell (Fig. 6) and the unit in this assembly is placed between the silver strips 32, 33 extending from the magnesium plate of the next to the last cell (Fig. 7). The insulation extends from the previous cell over the last one as at 45, Fig. 6. The lead extends on the same side of the battery as the positive lead, as in Fig. 9, or, if desired, it may extend to the opposite side. The insulation strip 37 is wound around the entire face of the battery as a protective measure and its free end may then be sealed with an adhesive as shown at 44, Fig. 9.

The method of this invention utilizes the raised sections (burrs such as 27, 28) for strips or plates used in the battery (Figs. 2 and 3) whose height is controlled so that either electrolyte channels may be provided for free flowing of the electrolyte and gas or a capillary spacing may be provided for a capillary flow of the electrolyte. Voltage may be varied by varying the height of the burrs and thus increasing or decreasing the plate distances; the build-up of insoluble salts, causing excessive heating and decreasing battery life, is also avoided by thus spacing the plates or strips. A high discharge rate may be further achieved by piercing the silver strips 32, 33 as noted at 46, Fig. 1.

The provision of burrs further assists in dissipating heat of the reaction away from the plates, and in providing for smooth flow of the gases of the reaction through the pierced material, drawing the electrolyte freely through and around the entire cell, further promoting cooling. Due to the novel features of the battery of this invention, as outlined above, as the rate of discharge increases with increased heat, the gas increases and passes as small bubbles in a steady flow, preventing accumulation and discharge of gases erratically and in large concentration.

From the foregoing description it will be noted that the present invention discloses a battery embodying many novel features and advantages, including the following: A paper separated battery having a high discharge rate; successful, practical use of fused rolled silver chloride in a paper-wound battery; utilization of a chloride plate or strip having the faces thereof prereduced to metallic-silver, in a paper-wound battery; provision of raised portions of active materials of predetermined height to form a capillary or channel for the electrolyte; use of silver connections for the cells of such battery; utilizing both faces of a magnesium strip or plate in such battery; use of silver strip to conduct heat away from the battery cells; use of perforated cellophane as a separator; special soldering of silver to magnesium; forming pierced burrs in silver in such batteries for cooling purposes; provision of a continuous connected margin on the magnesium strip or plate of such battery, preventing voltage jumping; provision of a paper-wound battery effective without use of a wetting agent; use of electrodes of a different width than the strips or plates of such battery allowing a water pocket to be formed, the differential being the wider magnesium strip or plate which is protected from entering the reaction by insulation, the electrolyte pocket acting as a cooling medium.

The following is a table of the discharge time of a battery unit, 425 grams gross, 2½ inches long, 2¾ inches o. d., embodying the invention, having four cells, in series, discharged in synthetic sea water at 1° C. through a fixed resistanec of .14 plus ohms:

| Time in— | | Volts | Amperes |
|---|---|---|---|
| Minutes | Seconds | | |
| (1) | 15 | 5.25 | 36.67 |
|  | 30 | 5.50 | 38.33 |
|  | 60 | 5.55 | 38.42 |
|  | 90 | 5.55 | 38.42 |
| (2) | 120 | 5.55 | 38.42 |
|  | 150 | 5.25 | 38.25 |
| (3) | 180 | 5.50 | 38.00 |
|  | 210 | 5.50 | 37.75 |
| (4) | 240 | 5.475 | 37.67 |
|  | 270 | 5.40 | 37.33 |
| (5) | 300 | 5.375 | 37.00 |
|  | 330 | 5.325 | 36.83 |
| (6) | 360 | 5.30 | 36.67 |
|  | 390 | 5.275 | 36.42 |
| (7) | 420 | 5.25 | 36.33 |
|  | 450 | 5.25 | 36.08 |
| (8) | 480 | 5.25 | 36.00 |
|  | 510 | 5.25 | 36.00 |
| (9) | 540 | 5.25 | 36.00 |
|  | 570 | 5.225 | 36.00 |
| (10) | 600 | 5.225 | 36.00 |
|  | 630 | 5.225 | 36.00 |
| (11) | 660 | 5.225 | 35.92 |
|  | 690 | 5.225 | 35.83 |
| (12) | 720 | 5.225 | 36.00 |
|  | 750 | 5.225 | 35.92 |
| (13) | 780 | 5.20 | 35.67 |
|  | 810 | 5.15 | 35.58 |
| (14) | 840 | 5.10 | 35.25 |
|  | 870 | 5.00 | 34.67 |
| (15) | 900 | 5.00 | 34.08 |

The perforations of the silver strips 32, 33 are preferably, as above noted in both directions, and, as the silver chloride strips 19 and 20 are perforated, the battery discharges the gases generated by the reaction of the silver chloride-magnesium strips in the electrolyte pass outwardly, away from the strips, resulting in an oven, predictable discharge rate. As soon as the gases have passed out, the space they occupied is filled with electrolyte, which cools the battery; electrolyte will also pass to the reacting silver chloride plates from the outside, through the perforations or burrs in the silver strips 32, 33 and thence through the perforations or burrs in the silver chloride strips. The silver strips 32, 33 are good conductors of heat; they aid in conducting the heat of the reaction away from the reaction plates.

Having thus described our invention, what we claim as new and desire to secure by Letters Patent is:

1. A deferred action battery having a high discharge rate on immersion in salt water, comprising a battery cell having a metallic electrode sheet provided with a multitude of perforations and with burrs upstanding from the surfaces thereof; a liquid permeable spacer means disposed adjacent the burrs of said electrode sheet, a fused chloride sheet disposed adjacent said spacer means and separated thereby from said metallic electrode sheet, said fused chloride sheet being provided with a multitude of perforations and with burrs upstanding toward said electrode sheet, and a second metallic electrode sheet of opposite polarity to that of the first named electrode sheet adjacent said fused chloride sheet in electrical contact therewith through burrs upstanding from one of said fused chloride and second metallic electrode sheets, said burrs serving to space said sheets apart, whereby space for electrolyte is provided between each member of said battery, and electrolyte is free to flow laterally across said battery cell.

2. In the battery cell of claim 1 wherein one of the electrode sheets is magnesium and the other is silver.

3. A deferred action battery having a high discharge rate on immersion in salt water, comprising a battery cell having a centrally disposed metallic electrode sheet provided with a multitude of perforations and with burrs upstanding from each side thereof, a liquid permeable spacer means disposed adjacent the burrs at each side of said centrally disposed sheet, a fused chloride sheet disposed adjacent each of said spacer means and separated thereby from said centrally disposed metallic sheet, said fused chloride sheet being provided with a multitude of perforations and with burrs upstanding toward said centrally disposed sheet, a metallic electrode sheet adjacent each of said fused chloride sheets in electrical contact therewith through burrs upstanding from one of said last mentioned electrode and fused chloride sheets, said burrs serving to space said sheets apart, whereby space for electrolyte is provided between each member of said battery, and electrolyte is free to flow laterally across said battery cell.

4. A deferred action battery comprising a plurality of battery cells as defined in claim 3 disposed longitudinally and electrically connected battery terminals secured to electrode sheets of opposite polarity of the first and last cells, a sheet of insulating material disposed alongside the cells and extending at least the longitudinal length of the cells, the battery cells being wound with said insulating sheet disposed between successive windings.

5. In the battery of claim 4, a central core medially axially apertured to promote complete flow of the electrolyte liquid therethrough on immersion, said battery being so wound on said core.

6. In the battery cell of claim 3 wherein the surface of the fused chloride sheet is in a chemically reduced state.

7. A deferred action battery having a high discharge rate on immersion in salt water, comprising a battery cell having a centrally disposed metallic electrode sheet provided with a multitude of perforations and with burrs upstanding from each side thereof, a liquid permeable spacer means disposed adjacent the burrs of each side of said centrally disposed sheet, a fused chloride sheet disposed adjacent each said spacer means and separated thereby from said centrally disposed sheet, said fused chloride sheet being provided with a multitude of perforations and with burrs upstanding toward said centrally disposed sheet, a metallic electrode sheet adjacent each of said fused chloride sheets in electrical contact therewith by burrs upstanding from one of said last mentioned electrode and fused chloride sheets, the burrs serving to space said sheets apart, whereby space for electrolyte is provided between each member of said battery cell, and electrolyte is free to flow laterally across said battery cell, an impermeable sheet of insulating material disposed longitudinally of said battery cell, and a central core, said battery cell being wound on said core with said insulating sheet between successive convolutions.

8. A deferred action battery having a high discharge rate on immersion in salt water, comprising a battery cell having a centrally disposed metallic electrode sheet provided with a multitude of perforations and with burrs upstanding from each side thereof, a liquid permeable spacer means disposed adjacent the burrs of each side of said centrally disposed electrode sheet, a fused chloride sheet disposed adjacent each said spacer means and separated thereby from said centrally disposed metallic sheet, said fused chloride sheet being provided with a multitude of perforations and with burrs upstanding toward said centrally disposed sheet, a perforated metallic cathode electrode sheet adjacent each of said fused chloride sheets, the latter having burrs upstanding in electrical contact with the last mentioned electrode sheet, the burrs serving to space apart said fused chloride and electrode sheets, whereby space for electrolyte is provided between each member of said battery and electrolyte is free to flow laterally across said battery cell, a sheet of insulating material disposed longitudinally of said battery cell, and a central core, said battery cell being wound on said core with said insulating sheet between successive convolutions.

9. In the battery of claim 8, burrs upstanding from both surfaces of said last mentioned electrode sheet to provide additional space for electrolyte between said electrode sheet and said insulating material.

10. In the battery of claim 7 wherein the first named electrode sheet is magnesium and the last mentioned electrode sheet is silver.

11. In the battery of claim 1 wherein said liquid permeable spacer means comprises a paper tissue strip and a perforated cellophane strip.

12. In the battery of claim 1 wherein the burr heights are about 2 to 3 thousandths of an inch.

13. A deferred action battery comprising a plurality of battery cells as defined in claim 3 having electrical connections of said battery cells disposed longitudinally and electrically connected battery terminals secured to electrode sheets of opposite polarity of the first and last cells, a sheet of insulating material disposed alongside the cells and extending at least the longitudinal length of the cells, the battery cells being wound with said insulating sheet disposed between successive windings, said battery having terminals extending one from the first cell and one from the last cell only.

14. A deferred action battery having a high discharge rate on immersion in salt water, comprising a battery cell having a metallic electrode sheet provided with a multitude of perforations and with burrs of predetermined definite height upstanding from the surfaces thereof, a liquid permeable spacer means disposed adjacent the burrs of said electrode sheet, a fused chloride sheet disposed adjacent said spacer means and separated thereby from said metallic electrode sheet, said fused chloride sheet being provided with a multitude of perforations and with burrs of definite height upstanding toward said electrode sheet, and a second metallic electrode sheet of opposite polarity to that of the first named electrode sheet adjacent said fused chloride sheet in electrical contact therewith through burrs of definite height upstanding from one of said fused chloride and second metallic sheets, said burrs of definite height serving to space said sheets apart, whereby space for electrolyte is provided between each member of said battery and electrolyte is free to flow laterally across said battery cell, enhancing the discharge rate of said battery cell.

15. In the battery of claim 14 wherein the burr heights are 2 to 3 thousandths of an inch for the first mentioned metallic sheet and fused chloride sheet and 5 to 10 thousandths of an inch for the second metallic electrode sheet of opposite polarity.

References Cited in the file of this patent

UNITED STATES PATENTS

| | | |
|---|---|---|
| 678,512 | Perry | July 16, 1901 |
| 2,428,850 | Lawson | Oct. 14, 1947 |
| 2,445,306 | Lawson | July 13, 1948 |
| 2,564,495 | Mullen | Aug. 14, 1951 |
| 2,661,388 | Warner et al. | Dec. 1, 1953 |
| 2,663,749 | Warner et al. | Dec. 22, 1953 |

FOREIGN PATENTS

| | | |
|---|---|---|
| 33,780 | Sweden | Mar. 20, 1911 |